United States Patent
Victor et al.

[11] 3,938,863
[45] Feb. 17, 1976

[54] AEROSTATIC BEARING

[75] Inventors: Hans R. Victor; Jurgen Schmidt, both of Karlsruhe, Germany

[73] Assignee: SKF Kugellagerfabriken, Schweinfurt, Germany

[22] Filed: Sept. 27, 1974

[21] Appl. No.: 509,749

[30] Foreign Application Priority Data
Sept. 29, 1973 Germany............................ 2349072

[52] U.S. Cl.................................... 308/9; 308/107
[51] Int. Cl.².................... F16C 17/16; F16C 13/02
[58] Field of Search ..... 308/9, 93, 100, 107, DIG. 1

[56] References Cited
UNITED STATES PATENTS

| | | | |
|---|---|---|---|
| 3,499,692 | 3/1970 | Kaiser | 308/9 |
| 3,645,590 | 2/1972 | Bird et al. | 308/9 |
| 3,799,630 | 3/1974 | Chisholm | 308/9 |

FOREIGN PATENTS OR APPLICATIONS

| | | | |
|---|---|---|---|
| 1,085,184 | 9/1967 | United Kingdom | 308/9 |
| 1,225,067 | 3/1971 | United Kingdom | 308/9 |

Primary Examiner—M. Henson Wood, Jr.
Assistant Examiner—Gene A. Church

[57] ABSTRACT

An aerostatic bearing for the shaft of a spinning turbine of an open end spinning unit. The shaft is located in a cylindrically hollow housing to which gas under pressure is supplied to form a radial aerostatic bearing about the shaft. A permeable supporting sleeve is preferably interposed between the housing and the shaft. The shaft is provided with a radial duct and an axial bore opening only toward the rear end of the shaft. A supporting surface is fixed opposite the rear end of the shaft and is spaced therefrom so that the exhausting gaseous media impinges thereon and forms an axial bearing. Preferably, means are provided for resiliently biasing the shaft toward the supporting surface against the action of the axial aerostatic bearing. Such means are preferably magnetic.

19 Claims, 2 Drawing Figures

AEROSTATIC BEARING

BACKGROUND OF THE INVENTION

The present invention relates to the journalling of spinning turbines of open end spinning units and in particular to a combination radial and axial aerostatic bearing for journalling the shaft of the spinning turbine.

It has been known to journal the shaft of a spinning turbine in a radial aerostatic bearing comprising a generally cylindrically hollow housing surrounding the shaft, through which the gaseous lubricating medium is supplied and the shaft being provided with radial ducts which communicate with an axial duct through which the gaseous medium is exhausted. A bearing of this type is described in German patent publication 2110261 which shows the axial duct communicating with the surrounding environment, in which the exhausted medium is in fact discharged. In German patent publications 1,934,099 corresponding to British Pat. No. 1,225,067, German patent publication 1,933,929 and British Pat. No. 1,085,184 disclose devices wherein the spinning turbine is supported with an aerostatic radial bearing as well as an aerostatic axially bearing. In these devices separate ducts, leading from a common air supply, extend to separate radial and axial bearing constructions. As a result these devices are rather complex in their structure and consume relatively great amounts of air or medium. The cost of manufacture is thus relatively expensive as is the cost of operation.

It is an object of the present invention to provide a simple and easily constructed aerostatic bearing for spinning turbines which overcome the disadvantages of the prior art.

It is another object of the present invention to provide a combined axial and radial aerostatic bearing for a spinning turbine.

It is still another object of the present invention to provide a combined axial and radial aerostatic bearing in which less air is consumed than in those devices heretofore known.

The foregoing objects, together with other objects as well as numerous advantages of the present invention will be apparent from the following disclosure of the invention.

SUMMARY OF THE INVENTION

According to the present invention a spinning turbine of an open end spinning unit is journalled in a combined aerostatic axial and radial bearing comprising a cylindrically hollow housing surrounding the shaft through which the gaseous medium under pressure is introduced. And which forms with the shaft a radial aerostatic bearing. The shaft is provided with at least one radial duct and an axial bore communicating with a duct for the exhaust of the medium. The bore is closed to the end of the shaft on which the turbine is mounted and extends through the shaft to open at the other end thereof. A supporting surface or wall is fixed, with respect to the housing, at the end of the shaft and is spaced therefrom opposite the opening of the bore. The exhausting gas exiting from the bore impinges upon the supporting surface and produces with the end of the shaft an axial aerostatic bearing for the shaft.

The major advantage of the present invention lies in the fact that the axial duct serves both to exhaust the air and to supply the medium to the axial bearing formed by the end of the shaft and the supporting surface. As such only one source of medium under pressure and one supply means is required. The apparatus as a whole can therefore be made smaller, more compact, lighter in weight and more economical.

Full details of the foregoing and other aspects of the present invention are set forth in the following description of its preferred embodiments and are shown in the accompanying drawings.

DESCRIPTION OF THE INVENTION

Figure 1:
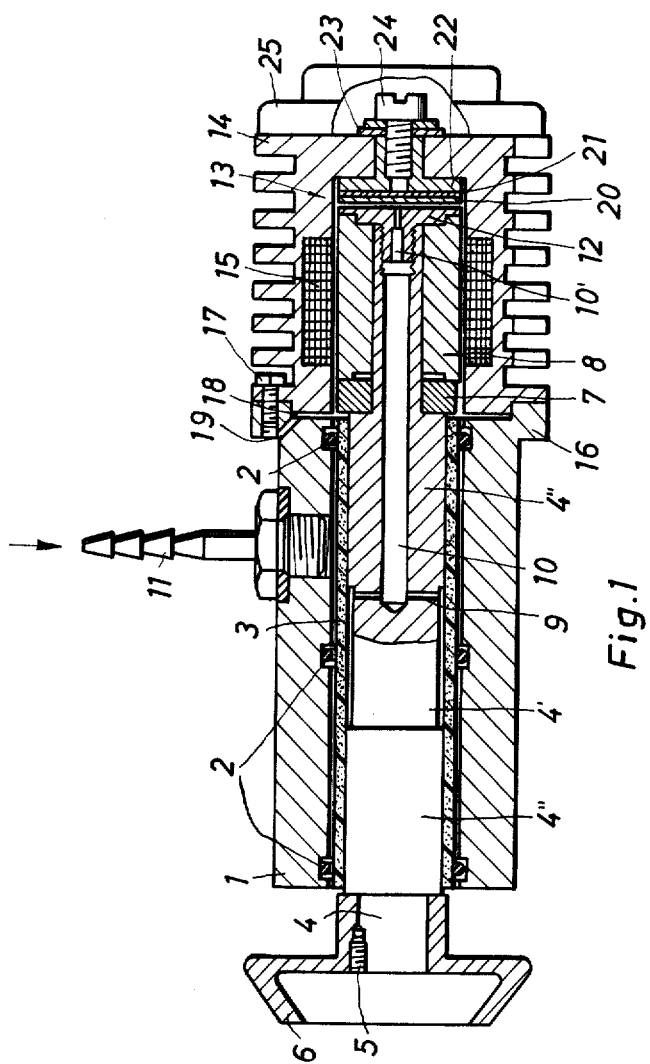
FIG. 1 is a longitudinal section through a spinning turbine and its bearing, showing the present invention.

As seen in FIG. 1 the bearing comprises a main housing section 1 forming a bearing sleeve of generally cylindrically hollow form. A plurality of O-rings 2 are set within corresponding annular grooves formed on the inner surface of the housing section. The O-rings 2 (in the present embodiment being three in number) support a hollow cylindrically permeable bearing sleeve 3 so that an annular air gap or space is formed between the housing and the sleeve. The O-rings 2 also permit oscillatory reciprocation of the sleeve axially within the housing. The permeable sleeve may be made of sintered metal, plastic or the like, or may be a solid sleeve provided with radial holes etc., over its entire surface. Located within the sleeve 3 is the shaft, generally depicted by the numeral 4, for the spinning turbine. The spinning turbine comprises a chamber 6 which is removably attached, as for example by a set screw 5 to the front end of the shaft 4. The shaft 4 extends rearwardly beyond the main housing section 1 and terminates in an extending necked down cylindrical extension about which a balancing ring or flywheel 7 and a rotor 8 of an electric motor are mounted.

The shaft 4 has a central portion 4' which lies intermediate end portions 4'' of larger diameter, equal to each other. The larger diameter portions 4'' are substantially equal in outer diameter to the inner diameter of the permeable sleeve 3. At least one radial duct 9 is formed through the shaft within the smaller diameter portion 4'. The duct 9 communicates with an axial bore 10, in the form of a blind bore, formed substantially along the center of the shaft. The axial bore 10 extends from the radial duct 9 only toward the rear end of the shaft through the necked down portion carrying the flywheel 7 and the rotor 8 and opens outwardly of the frontal face of the shaft 4. The shaft 4 can be made in the form of a hollow cylinder, i.e., having a continuous axial duct. In this construction the axial duct can be tightly closed in the area between the radial duct 9 and the spinning chamber 6 by the insertion of a suitable plug or other packing device.

A hose connection 11 is secured, in a manner to form a seal, radially within the wall of the main housing section 1. Compressed medium, such as air or other inert gas is supplied from a source not shown through a pipe secured to the connection 11 so that the medium passes into the annular space formed between the main section 1 of the housing and the permeable shell 3. The medium under pressure penetrates through the permeable shell and creates between the permeable shell 3 and the two enlarged portions 4'' of the shaft 4 an air cushion which radially supports the shaft 4 during its rotation. In the arrangement shown in FIG. 1, wherein three O-rings 2 are provided, the middle ring is preferably formed with at least one axial passage such as a hole or groove, which thus permits the air to move between the two outer rings and insures equalization of pressure and unhampered air scavenging in the entire annular scap between the main housing section 1 and the sleeve 3. In order to allow the compressed medium to pass through the permeable sleeve 3 only in the regions of the two axially outer portions of the shaft, i.e., the enlarged diameter portions 4'', the permeable sleeve 3 can be made impermeable to the gaseous media in the zone opposite the smaller diameter portion 4' of the shaft. This can be accomplished by coating at least the inner surface of the permeable sleeve 3, in this particular zone with a layer of rapid drying enamel. This measure insures particularly good supporting and bearing capacity for the shaft 4 by maintaining the air cushion under uniform pressure at both ends of the sleeve 3 while maintaining adequate scavenging of the medium. The medium escaping from the space between the permeable sleeve 3 and the two outer portions of the shaft 4'' passes into the annular space between the permeable sleeve 3 and the smaller diameter portion 4' of the shaft from which it passes through the radial duct 9 into the axial duct 10.

Mounted on the frontal face at the rear end of the shaft 4 is a disc-like bearing cap 12 having a hub which may be screwed into the end of the shaft and if necessary also glued or otherwise adhered to conjointly rotate with the shaft 4. The bearing cap 12 serves to fix the rotor 8 and the flywheel 7 on the necked down end of the shaft 4. The rotor and the flywheel may be conventionally secured to the shaft as by gluing or by the use of other fastening means so as to conjointly rotate with the shaft as well. The bearing cap 12 therefore has a diameter at least equal to the largest diameter of the shaft 4 and/or the rotor 8. The bearing cap 12 is provided with an axial hole 10' which terminates at its outer end rearwardly in a relatively narrow diameter nozzle-type opening so as to restrict the exhausting medium. The bearing cap 12 has a substantially planar outer face.

Located opposite the face of the bearing cap 12 is a supporting surface or wall, generally depicted by the numeral 13. The supporting surface 13 is mounted in a second housing section 14 which is generally cylindrically hollow and closed at the end on which the supporting surface 13 is arranged. The second housing section 14 forms a cover for the rear end of the shaft 4 and houses the stator 15 of the electric motor in opposition to the rotor 8. The second housing section 14 is detachably secured to a radial flange 16 formed at the rear end of the main housing section 1 by means of suitable fasteners such as the bolts 17. The main housing section 1 and the second housing section 14 are in general axially aligned and arranged so as to maintain an axial gap 18 between their ends. At least one oblique duct 19 leads from the axial gap 18 outwardly into the surrounding atmosphere. The axial gap 18 communicates with the annular space between the stator 15 and the rotor 8 of the electric motor. Thus the exhausted air exiting from the nozzle portion 10' into the axial bearing formed by the bearing cap 12 and the supporting surface 13 can escape between the rotor 8 and the stator 15 out of the axial gap 18 and the oblique duct 19. The stream of air thus produced acts as a cooling media on the rotor 8 of the electric motor.

The supporting surface, generally depicted by the numeral 13, which forms an abutment wall cooperating with the spaced bearing cap 12 to form the aerostatic axial bearing, is itself formed of a planar disc 20 which is secured by a layer of adhesive 21 to a T-shaped pedestal support 22 which is attached to the end wall of the second housing cover member 14. The stem of the pedestal support 22 extends through a hole in the bottom wall of the housing member 14 and is held therein by a screw fastener 24 or similar bolt provided with a sealing washer 23 and end cover 25 is attached to the second housing member 14 to cover the attachment screw 24.

The planar disc 20, forming the abutment plate for the axial aerostatic bearing is formed of ferromagnetic material, such as iron, iron filings or iron particles embedded in a plastic carrier, this ferromagnetic material cooperates with the magnetic forces inherent in the rotor 8 of the electric motor which in operation produces a magnetic force which biases the shaft 4 toward the ferromagnetic disc 20, i.e.: directed oppositely to the aerostatic axial support bearing effected by the impingement of air on the disc 20. Therefore, in operation, the exhaust of air under pressure through the nozzle 10' creates a cushion of compressed air between the bearing cap 12 and the disc 20 which overcomes the normal bias of the magnetic force so that there is no metal contact between the parts of the aerostatic bearing. The planar disc 20 forming the aerostatic abutment plate can be coated on its surface with a low friction material which has emergency running properties so that in the event of any axial overloading of the shaft 4 resulting in the undesirable contact between the disc 20 and the bearing cap 12, such contact would be without excessive friction and without the production of heat.

The use of a layer of adhesive 21 to fix the planar abutment disc 20 to the supporting pedestal 22 has several advantages if it is carried out in the manner to be described below. One of the important advantages lies in the ability to insure the highest degree of planar abutment freedom between the frontal end of the shaft 4 and the face of the planar disc 20. In accordance with the preferred procedure, the secondary housing member 14 is detached from the main housing portion 1 and has the pedestal support 22 initially fixed in its end wall. Simultaneously the shaft 4, supported in the housing 1 is supplied with compressed air which exhausts freely through the nozzle 10'. The planar abutment disc 20 is then applied directly to the face of the bearing cap 12 and is held thereon by the magnetic force exerted by the rotor 8. The air cushion formed between the face of the bearing cap 12 and the planar abutment disc 20 enables the planar disc 20 to be self-centered, free from friction in the magnetic field. The free surface of the planar disc 20 (i.e., its rear face) is then coated with the layer of adhesive and the second housing part 14 is then placed over the end of the shaft 4 and is subsequently attached to the main housing section 1 so that the adhesive layer 21 on the planar disc 20 comes into contact with the face of the pedestal support 22. The layer of adhesive 21 is then allowed to harden under the continued introduction of compressed medium which, exhausting from the nozzle 10', produces the accurate spacing of the planar abutment disc 20 from the bearing cap 12. During the hardening process the adhesive layer flows so that the uniform spacing is obtained and any manufacturing errors or tolerances present in the production of either the planar bearing cap or the planar abutment disc are fully compensated for and adjusted in relation to one another. Simultaneously, the rotation of the shaft produced by the assembly of the rotor and stator under operating conditions by the joining of the housing members 1 and 14 establishes dynamic operating conditions so that the uniform bearing gap between the bearing cap and the abutment disc 20 is even further insured.

It will be therefore seen from the foregoing that the present apparatus provides a journalling for the shaft of a spinning turbine which combines both a radial aerostatic bearing and an axial aerostatic bearing having a single source of compressed air. The pressure of the air in both the radial and axial bearing portions are equalized by the fact that the communicating axial duct 10 exists between the two. Further, the pressurized medium is exhausted through the electric motor which not only acts to cool the electric motor but also acts as a radial bearing between the stator and the rotor of the motor. The present apparatus thus combines the advantages inherent in a static pneumatic system as well as in a dynamic pneumatic system. Further, the use of a magnetic system acting along the longitudinal axis of the shaft in direct opposition to the axial aerostatic bearing has itself several advantages. This provides a resilient axial bias on the shaft which permits the shaft a certain degree of oscillation or axial reciprocation while tending to maintain the uniform bearing gap in the axial aerostatic bearing section. As a result, the shaft can absorb the normal forces of operation in the spinning chamber 6 without its shaft binding within its bearing.

Figure 2:
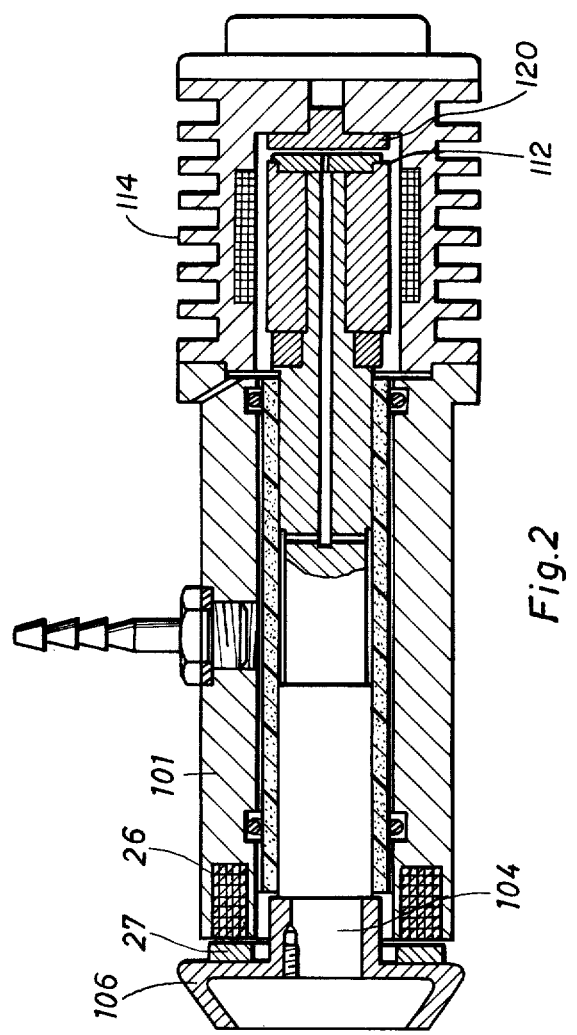
FIG. 2 is a view similar to that of FIG. 1 showing a second embodiment of the present invention.

A modification of the present invention is depicted in FIG. 2 wherein the device differs from that shown in FIG. 1 only in the fact that the magnetic force acting axially on the shaft is located in association with the spinning chamber. As seen in FIG. 2 the frontal end of the main housing section 101 is provided with an annular magnet 26 embedded within a conforming annular slot or groove so as to completely surround the shaft 104 and open toward the back of the spinning chamber 106. A ferromagnetic member, in the form of an annular ring 27 is attached to or formed integrally with the spinning chamber 106 in opposition to the magnet 26. The annular magnet 26 and the ferromagnet ring 27 act to normally bias the spinning chamber 106 toward the housing 101 thus pushing the shaft 104 to the right as seen in FIG. 2. In the present embodiment the axial aerostatic bearing generally depicted by the numeral 13 may be of simplified construction, since it does not require the use of the magnetic means at this end. Thus the bearing cap 112 at the rear end of the shaft 104 can be of simpler construction as can the planar abutment disc 120. In each case these members 112 and 120 may be adhered or otherwise fixed to the shaft and rotor and to the second housing portion 114 respectively in any suitable manner. FIG. 2 also shows the use of only two O-rings locating and positioning the permeable sleeve providing a single bearing chamber about the sleeve. As regards the remaining construction of the device shown in FIG. 2 the elements are identical and equivalent to those shown in FIG. 1 and function in similar manner.

It will be seen from the foregoing that the various objects and advantages enumerated earlier herein have been easily obtained by the present invention. Various changes and embodiments have also been suggested and it is intended that the present disclosure be taken as illustrative only and not limiting of the present invention.

What is claimed is:

1. An aerostatic bearing for the spinning turbine of an open end spinning machine comprising a rotatable shaft secured at one end to said turbine, a cylindrically hollow housing surrounding said shaft, means for introducing a gaseous medium under pressure through said housing to form a radial aerostatic bearing about said shaft, said shaft having at least one radial duct and an axial bore communicating with said duct for exhaust of said gaseous medium, said bore being closed to said one end of said shaft and extending through said shaft to open at the other end, an abutment surface fixed with respect to said housing spaced from the other end of said shaft opposite to the opening of said bore to receive the gaseoue media exhausting therefrom and to produce an axial aerostatic bearing with the end of said shaft.

2. The bearing according to claim 1 including a permeable sleeve interposed between said shaft and said housing.

3. The bearing according to claim 1 including means for resiliently biasing said shaft axially toward said abutment surface.

4. The bearing according to claim 3 wherein said resilient biasing means is magnetic.

5. The bearing according to claim 1 wherein said shaft is provided with an axial section intermediate its ends of reduced diameter and said radial duct is located within said reduced diameter section.

6. The bearing according to claim 5 including a permeable sleeve surrounding said shaft, the section of said sleeve conforming to the section of said shaft of reduced diameter being rendered impermeable on at least one surface.

7. The bearing according to claim 2 including a plurality of O-rings interposed between said housing and said permeable sleeve, to maintain said permeable sleeve spaced from said housing to form an annular air gap.

8. The bearing according to claim 1 wherein said shaft is provided with a bearing cap at its other end, said cap having an axial hole aligned with said axial bore in said shaft to cause impingement of said medium on said abutment surface.

9. The bearing according to claim 1 wherein said abutment surface is detachably secured to said housing.

10. The bearing according to claim 1 wherein said magnetic means comprises an annular magnet secured to said housing at the end adjacent said spinning turbine and cooperating magnetic means conjointly rotatable with said shaft in opposition to said annular magnet.

11. The bearing according to claim 1 wherein said abutment surface is coated with a low friction material.

12. The bearing according to claim 1 wherein said abutment surface is fixed to said housing by an adhesive.

13. The bearing according to claim 12 wherein said adhesive is hardened during operation of said turbine and wherein said abutment surface disc may be dynamically positioned in a minimum planar abutment stroke with respect to the opposing end of said shaft.

14. The bearing according to claim 13 wherein said adhesive is located directly between said disc and said housing.

15. The bearing according to claim 13 wherein said abutment surface is adhered to a support, said support being removably secured to said housing.

16. The bearing according to claim 1 including an electric motor surrounding said shaft, the rotor of said electric motor being attached to said shaft and the stator of said electric motor being secured to said housing.

17. The bearing according to claim 1 wherein said housing is formed of two axial sections and the end of said shaft opposite the spinning turbine extends beyond one of said housing sections, an electric motor surrounding said extending shaft, the rotor of said electric motor being attached to said extending shaft, the stator of said electric motor being secured to the other one of said housing sections, said housing sections being removably attached to each other.

18. The bearing according to claim 16 wherein said abutment surface comprises a planar disc of ferromagnetic material adapted to cooperate with said rotor of said electric motor to develop an attractive magnetic force axially along said shaft.

19. The bearing according to claim 17 wherein said housing sections are spaced from each other to provide a gap for the exhaust of gaseous medium from between said housing sections, said rotor and stator of said electric motor being aligned so that the space therebetween communicates with the axial aerostatic bearing and said gap.

* * * * *